United States Patent [19]

Ishimaru

[11] Patent Number: 5,714,272
[45] Date of Patent: Feb. 3, 1998

[54] HEAT INSULATING FILM

[75] Inventor: Hajime Ishimaru, Tsukuba, Japan

[73] Assignee: Zaidan Houjin Shinku Kagaku Kenkyujo, Japan

[21] Appl. No.: 631,912

[22] Filed: Apr. 12, 1996

Related U.S. Application Data

[63] Continuation-in-part of Ser. No. 989,190, Dec. 11, 1992, abandoned.

[30] Foreign Application Priority Data

Dec. 12, 1991 [JP] Japan ................. 3-351583

[51] Int. Cl.⁶ .................. B32B 7/02; B32B 15/08
[52] U.S. Cl. .............. 428/624; 428/632; 428/626; 428/652; 428/654; 428/671; 428/675
[58] Field of Search ............... 428/626, 622, 428/624, 623, 618, 615, 616, 938, 600, 611, 621, 631, 632, 654, 652, 671, 675; 126/713, 907; 427/328

[56] References Cited

U.S. PATENT DOCUMENTS

| | | | |
|---|---|---|---|
| 3,370,980 | 2/1968 | Anderson | 156/600 |
| 4,068,034 | 1/1978 | Segawa et al. | 428/263 |
| 4,122,239 | 10/1978 | Riboulet et al. | 428/621 |
| 4,414,249 | 11/1983 | Ulion et al. | 427/248.1 |
| 4,550,622 | 11/1985 | Takayama et al. | 428/611 |
| 4,819,113 | 4/1989 | Kubota et al. | 360/126 |
| 4,990,362 | 2/1991 | Kibe et al. | 427/38 |
| 5,112,699 | 5/1992 | Chang | 428/641 |
| 5,305,165 | 4/1994 | Brezoczky et al. | 360/103 |
| 5,353,453 | 10/1994 | Naumann | 5/417 |
| 5,389,398 | 2/1995 | Suzuki et al. | 427/130 |

FOREIGN PATENT DOCUMENTS

| | | | |
|---|---|---|---|
| 5-164296 | 6/1993 | Japan | B32B 7/02 |
| 5-164297 | 6/1993 | Japan | B32B 1/02 |

OTHER PUBLICATIONS

Metals Handbook Ninth Edition, vol. 5, 1983, pp. 387, 392, & 394.

Chopra et al., Influence of Deposition Parameters on the Coalscence Stage of Growth of Metal Films, 1967.

Journal of Vacuum Science & Technology A, Second Series, vol. 13, No. 5, Sep./Oct. 1995, Nobuaki Gotoh et al., "Liquid helium cryopumps with low–emissivity Al film coatings and low helium consumption".

Primary Examiner—David A. Simmons
Assistant Examiner—Linda L. Gray
Attorney, Agent, or Firm—Adams & Wilks

[57] ABSTRACT

A heat insulating film comprises a plastic film, a surface metal layer coating the plastic film, a thin metal layer coating the surface metal layer and a protective membrane layer coating the thin metal layer. The surface metal layer has crystal grains having flat upper surfaces and the thin metal layer has flat crystal grains disposed in a single grain layer and formed and overlying respective flat upper surfaces of the crystal grains of the surface metal layer. Heat rays which irradiate on the heat insulating film pass freely through the protective membrane layer but are reflected by the crystal grains of the thin metal layer. Absorption of heat rays by the heat insulating film is remarkably suppressed.

24 Claims, 2 Drawing Sheets

F I G. 1
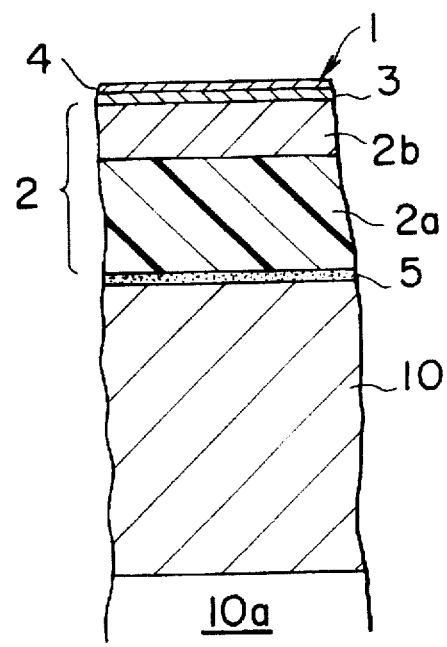
F I G. 2
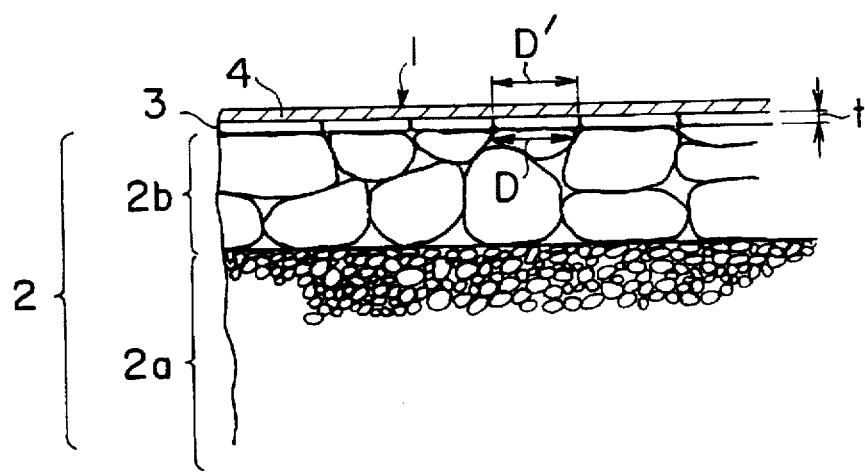

HEAT INSULATING FILM

This is a continuation-in-part of application Ser. No. 07/989,190 filed Dec. 11, 1992 now abandoned.

BACKGROUND OF THE INVENTION

This invention relates to a heat insulating film which is particularly suitable for coating the outer surface of a wall, ceiling or floor of a thermostat chamber in order to maintain a low temperature or a high temperature in the chamber, or for coating the outer surface of a low temperature tank, by sticking it on those surfaces.

In general, materials such as glass wool or asbestos or the like are used for insulating heat. However, there are problems in that such heat insulating materials cannot prevent heat transmission due to radiation, and a layer for insulating heat using any of these materials is thick.

In the field of super-conduction machinery, for example, a material such as a polyester film coated with aluminum has been developed. However, heat insulating materials comprising a plastic film coated with aluminum, cannot prevent the absorption of radiant heat sufficiently.

SUMMARY OF THE INVENTION

The object of the present invention is to provide a heat insulating film by combining a plastic film with a thin metal layer so as to insulate the radiant heat effectively, by providing superflat crystal grains of metal having low heat emissivity which repel infrared rays or far infrared rays efficiently.

In order to achieve the above object, a heat insulating film according to the present invention is characterized in that the heat insulating film comprises a main film which is made of a plastic film covered with a surface layer of pure metal having large crystal grains having flat upper surfaces, and a thin metal layer coating the flat surface layer. The thin metal layer is made of a metal having low heat emissivity and coats the surface metal layer in such a way that superflat crystal grains of the thin metal layer, which are disposed in a single grain layer are arranged neighboring mutually so as to form a single grain-layer and to correspond respectively to the large crystal grains of the flat surface layer. That is, the flat crystal grains of the thin metal layer overlie respective flat upper surfaces of the crystal grains of the surface metal layer.

In an aspect of the present invention, the pure metal is made of aluminum or copper and each crystal grain of the surface layer of pure metal has a diameter of approximately 1 to 30 μm and, preferably a diameter of approximately 10–30 μm. The surface metal layer has a purity of more than 99.99%, preferably more than 99.9999%.

In another aspect of the present invention, the thin metal layer of low heat emissivity is made of aluminum, copper, silver or gold, the superflat crystal grains of the thin metal layer have approximately a diameter of 10–30 μm and a thickness of approximately 1–3 μm and the thin metal layer has a thickness of approximately 1–3 μm.

Furthermore, a heat insulating film according to the present invention is characterized in that the heat insulating film comprises a main film which is made of a plastic film covered with a flat surface layer of pure metal having large crystal grains, and a thin metal layer coating the flat surface layer, wherein the thin metal layer is made of a metal having low heat emissivity and coats the flat surface layer in such a way that superflat crystal grains of the thin metal layer are arranged neighboring mutually so as to form a single grain-layer and to correspond respectively to the large crystal grains of the flat surface layer. A protective membrane layer is formed on a surface of the thin metal layer for coating so as to maintain the surface of the thin metal layer stably permitting the infrared ray and the far infrared ray to pass through the protective membrane layer freely.

The above and further objects and features of the present invention will become more apparent from the following detailed description with reference to the accompaning drawings.

BRIEF DESCRIPTION OF THE DRAWINGS

FIG. 1 is a cross-sectional view showing an enlarged part of a heat insulating film as a preferred embodiment according to the present invention;

FIG. 2 is a further enlarged cross-sectional view of FIG. 1, showing a part of the heat insulating film of the present invention.

DETAILED DESCRIPTION

Figure 3:
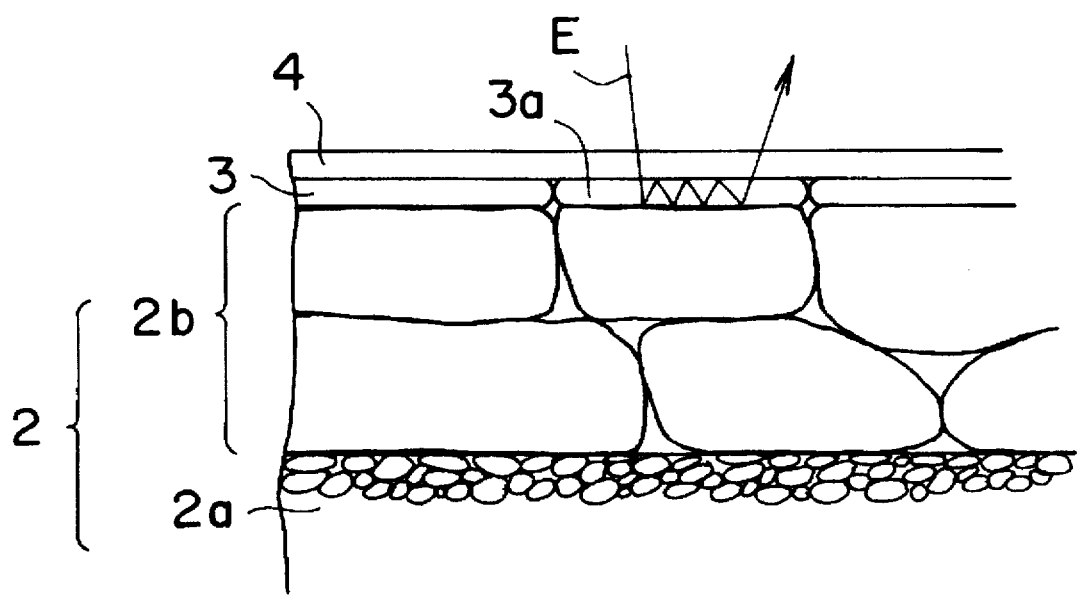
FIG. 3 is an enlarged cross-sectional view of the heat insulating film for illustrating an operation of the heat insulating film of the present invention.

Referring to FIG. 1 in which a preferred embodiment of the present invention is shown, a heat insulating film 1 is used in such a way that it is stuck on a tank wall 10 of a low temperature tank or the like with a glue or adhesive 5. A low temperature liquified gas such as a liquified helium is subsequently stored in the tank space 10a.

The heat insulating film 1, as described hereafter, prevents outer heat, such as infrared ray or far infrared ray (hereafter described as heat ray), from transmitting into the tank wall 10.

A main film 2 is formed of a plastic film 2a and a surface layer 2b of pure aluminum or pure copper which coats the surface of the plastic film 2a. A thin metal layer 3 which is made of aluminum, copper, silver or gold having low heat emissivity coats the surface of the surface layer 2b.

The heat emissivity of aluminum is about 0.006, that of copper is about 0.0004, that of silver is about 0.0002 and that of gold is about 0.0005.

As shown in FIG. 2, the surface layer 2b of pure aluminum or copper comprises crystal grains of such metal having flat upper surfaces defining a flat upper surface layer. Each diameter D of the crystal grains is in the range of approximately 1 to 30 μm, and preferably in the range of approximately 10–30 μm, and the upper surface of the layer 2b is finished smoothly by diamond grinding or the like. The surface layer 2b has a purity of more than 99.99%, preferably more than 99.9999%. On the flat upper surface of such finished surface layer 2b, the thin metal layer 3 is coated, for example by an epitaxial growth method.

The thin metal layer 3 is formed of only one layer of superflat crystal grains whose diameter D' in plan view and thickness t are approximately 10–30 μm and 1–3 μm respectively.

The protective membrane layer 4 is provided on the surface of the thin metal layer 3 in order that the thin metal layer 3 should not be rusted in the air when the thin metal layer 3 is made of a material other than gold. The protective membrane layer 4 is preferably made of, for example, transparent sapphire aluminum oxide ($Al_2O_3$), silicon oxide ($SiO_2$), zinc oxide (ZnO) or titanium oxide ($TiO_2$), which permits the heat ray to pass through it freely in order that during heat transmission the protective membrane layer 4 does not absorb heat rays.

When the tank wall or the like is coated by the heat insulating film 1 as stated above, the heat ray E coming to the tank wall 10 from the outside can freely pass through the protective membrane layer 4, the outermost layer, as shown in FIG. 3. However, when the heat ray E irradiates the thin metal layer 3 having superflat crystal grains 3a, the heat ray E is reflected towards the outside of the thin metal layer 3 passing through the protective membrane layer 4 again, after repeating a total reflection in the crystal grains 3a.

In general, at a border portion formed between the crystal grains neighboring mutually, the heat ray E may be absorbed to some extent. However, according to the present invention, each crystal grain 3a of the thin metal layer is formed superflat having a large diameter and overlies a respective flat upper surface of each crystal grain of the surface metal layer; so that the total length of the border portions of the grains of the thin metal layer 3 correspond to the border portions of the grains of the flat surface layer 2b, and the heat ray E that will enter inwardly through the border portions is substantially reduced and the absorption of the heat ray E remarkably suppressed. Furthermore, each crystal grain 3a of the thin metal layer corresponds to each crystal grain of the flat surface layer 2b so that total reflection of the heat ray E in the crystal grain 3a of the thin metal layer 3 is realized as shown in FIG. 3, thereby expelling the heat ray E.

Since a material such as aluminum, copper, silver or gold having an extremely low heat emissivity is used for forming the thin metal layer 3, the reflection of the heat ray E can be carried out very effectively.

Thus, the heat insulating film 1 is able to prevent the heat ray E from transmitting into the tank wall 10, so that evaporation of low temperature liquified gas or the like stored in the tank can be suppressed. When a high temperature fluid is stored in the tank, the heat transmission is similarly suppressed by the heat insulating film 1 so that the temperature in the tank is maintained.

As described above in detail, a heat insulating film according to the present invention has the following effects and advantages.

(1) Since the heat insulating film is stuck on the outer surface of a tank wall or the like, the infrared ray or the far infrared ray coming to the tank wall from the outside is reflected at the heat insulating film toward the outside after repeating a total reflection in a thin metal layer having superflat crystal grain and a very high effect heat can be achieved.

(2) Since the thin metal layer has a thickness of approximately 1–3 μm formed by superflat crystal grains which are laid along a flat surface of crystal grains of pure metal such as aluminum or copper, and whose diameter is large (about 1 to 30 μm, preferably 10–30 μm) and has a purity of more than 99.99%, preferably more than 99.9999%, forming a surface layer of a main film in such a way that the superflat crystal grains of said thin metal layer correspond to the crystal grains of said flat surface layer, the reflection rate of the infrared ray or the far infrared ray becomes remarkably high so that a sufficient heat insulation effect can be obtained.

(3) Since a material of low heat emissivity such as aluminum, copper, silver or gold is used for the thin metal layer, the effects of heat insulation can be increased.

(4) By covering the surface of the thin metal layer with a protective membrane layer which can stably permit the infrared ray or the far infrared ray to pass through the protective membrane layer freely, the effects of heat insulation can be maintained efficiently.

While the invention has been described in conjunction with a preferred specific embodiment thereof, it will be understood that this description is intended to illustrate and not limit the scope of the invention, which is defined by the following claims.

What is claimed is:

1. A heat insulating film comprising: a plastic film having upper and lower surfaces; a surface metal layer coating the upper surface of the plastic film and composed of crystal grains, the crystal grains at a top surface of the surface metal layer having flat upper surfaces; and a thin metal layer coating the top surface of the surface metal layer and composed of flat crystal grains, the flat crystal grains being disposed in a single grain layer and overlying respective flat upper surfaces of the crystal grains of the surface metal layer so that heat irradiated towards the inside of the heat insulating film is reflected by the thin metal layer towards the outside of the heat insulating film.

2. A heat insulating film as claimed in claim 1; wherein the crystal grains of the surface metal layer have a diameter of approximately 10–30 micrometers.

3. A heat insulating film as claimed in claim 2; wherein the surface metal layer is a metal selected from the group consisting of pure aluminum and pure copper.

4. A heat insulating film as claimed in claim 2; wherein the thin metal layer is a metal selected from the group consisting of aluminum, copper, silver and gold.

5. A heat insulating film as claimed in claim 3; wherein the thin metal layer is a metal selected from the group consisting of aluminum, copper, silver and gold.

6. A heat insulating film as claimed in claim 5; wherein the crystal grains of the thin metal layer have a diameter of approximately 10–30 micrometers and a thickness of approximately 1–3 micrometers.

7. A heat insulating film as claimed in claim 6; wherein the thin metal layer has a thickness of approximately 1–3 micrometers.

8. A heat insulating film as claimed in claim 1; wherein the surface metal layer is a metal selected from the group consisting of pure aluminum and pure copper.

9. A heat insulating film as claimed in claim 1; wherein the thin metal layer is a metal selected from the group consisting of aluminum, copper, silver and gold.

10. A heat insulating film as claimed in claim 1; wherein the crystal grains of the thin metal layer have a diameter of approximately 10–30 micrometers and a thickness of approximately 1–3 micrometers.

11. A heat insulating film as claimed in claim 10; wherein the thin metal layer has a thickness of approximately 1–3 micrometers.

12. A heat insulating film as claimed in claim 11; wherein the thin metal layer is a metal selected from the group consisting of aluminum, copper, silver and gold.

13. A heat insulating film as claimed in claim 1; wherein the flat crystal grains of the thin metal layer comprise epitaxially grown grains grown epitaxially on the flat upper surfaces of the crystal grains of the surface metal layer.

14. A heat insulating film as claimed in claim 1; wherein the crystal grains of the thin metal layer have a thickness of approximately 1–3 micrometers and the thin metal layer has a thickness of approximately 1–3 micrometers.

15. A heat insulating film for preventing absorption of radiant heat, comprising: a plastic film having upper and lower surfaces; a first metal layer coating the upper surface of the plastic film and composed of crystal grains, the crystal grains at a top surface of the first metal layer having flat upper surfaces; a second metal layer coating top surface of the first metal layer and composed of flat crystal grains, the flat crystal grains being disposed in a single grain layer and overlying respective flat upper surfaces of the crystal grains of the first metal layer; and a protective membrane layer coating the second metal layer so that heat irradiated towards the inside of the heat insulating film passes freely through the protective membrane layer and is reflected by the second metal layer towards the outside of the heat insulating film.

16. A heat insulating film as claimed in claim 15; wherein the protective membrane layer is a metal selected from the group consisting of aluminum oxide, silicon oxide, zinc oxide and titanium oxide.

17. A heat insulating film as claimed in claim 15; wherein the crystal grains of the first metal layer have a diameter of approximately 10–30 micrometers.

18. A heat insulating film as claimed in claim 17; wherein the first metal layer is a metal selected from the group consisting of pure aluminum and pure copper.

19. A heat insulating film as claimed in claim 15; wherein the first metal layer is a metal selected from the group consisting of pure aluminum and pure copper.

20. A heat insulating film as claimed in claim 15; wherein the crystal grains of the second metal layer have a diameter of approximately 10–30 micrometers and a thickness of approximately 1–3 micrometers.

21. A heat insulating film as claimed in claim 20; wherein the second metal layer has a thickness of approximately 1–3 micrometers.

22. A heat insulating film as claimed in claim 21; wherein the second metal layer is a metal selected from the group consisting of aluminum, copper, silver and gold.

23. A heat insulating film as claimed in claim 15; wherein the second metal layer is a metal selected from the group consisting of aluminum, copper, silver and gold.

24. A heat insulating film as claimed in claim 15; wherein the flat crystal grains of the second metal layer comprise epitaxially grown grains grown epitaxially on the flat upper surfaces of the crystal grains of the first metal layer.

* * * * *